US007033693B2

(12) United States Patent
Lee et al.

(10) Patent No.: US 7,033,693 B2
(45) Date of Patent: Apr. 25, 2006

(54) HETEROGENEOUS COMPOSITE BIPOLAR PLATE OF A FUEL CELL

(75) Inventors: Ming San Lee, Kaohsiung (TW); Long Jeng Chen, Kaohsiung (TW); Chin Chia Su, Taipei (TW); Ming Chih Lin, Changhua (TW)

(73) Assignee: National Sun Yat-Sen University, Kaohsiung (TW)

( * ) Notice: Subject to any disclaimer, the term of this patent is extended or adjusted under 35 U.S.C. 154(b) by 361 days.

(21) Appl. No.: 10/352,474

(22) Filed: Jan. 28, 2003

(65) Prior Publication Data

US 2003/0170525 A1 Sep. 11, 2003

(30) Foreign Application Priority Data

Feb. 15, 2002 (TW) .............................. 91201806 U
Feb. 15, 2002 (TW) .............................. 91201807 U
Feb. 15, 2002 (TW) .............................. 92101808 U

(51) Int. Cl.
*H01M 2/00* (2006.01)

(52) U.S. Cl. ............................ 429/34; 429/12; 429/35

(58) Field of Classification Search .................. 429/12, 429/34, 35

See application file for complete search history.

(56) References Cited

U.S. PATENT DOCUMENTS

| | | | | |
|---|---|---|---|---|
| 6,511,766 | B1 * | 1/2003 | Loutfy et al. | 429/34 |
| 6,638,657 | B1 * | 10/2003 | Cisar et al. | 429/35 |
| 2003/0152821 | A1 * | 8/2003 | Lisi et al. | 429/34 |

* cited by examiner

*Primary Examiner*—Dah-Wei Yuan
(74) *Attorney, Agent, or Firm*—Donald E. Hasse; Hasse & Nesbitt LLC

(57) ABSTRACT

A bipolar plate of a fuel cell comprises a body, two flow fields, and electrically conductive fibers. The body has a central portion and a peripheral portion surrounding the central portion. The flow fields are disposed on the two sides of the central portion of the body. The electrically conductive fibers are positioned in the central portion and penetrate therethrough.

28 Claims, 6 Drawing Sheets

HETEROGENEOUS COMPOSITE BIPOLAR PLATE OF A FUEL CELL

BACKGROUND OF THE INVENTION

1. Field of the Invention

The present invention generally relates to a fuel cell, and more particularly to a bipolar plate of a fuel cell.

2. Description of the Related Art

A fuel cell is an electrochemical device that converts chemical energy directly into electrical energy. For example, one type of fuel cell includes a proton exchange membrane (PEM), a membrane that may permit only protons to pass from anode to cathode of the fuel cell. In many fuel cells, anode and/or cathode comprise a layer of electrically conductive, catalytically active particles, usually in a polymeric hydrophobic binder such as polytetrafluoroethylene. (PTFE), on the proton exchange membrane. Alternatively, the anode and the cathode layers are applied to the gas diffusion structure. The gas diffusion structure allows the entry of fuel or oxidant to the cell. The gas diffusion/electrode structure, such as carbon cloth or paper material, is pressed to the membrane. The gas diffusion/electrode structure provides the functions that hydrogen (fuel) is effectively transported to the anode catalyst and that oxygen (oxidant) is effectively transported to the cathode catalyst. The resulting structure consisting of the membrane, electrodes and optional gas diffusion structure is referred to as a membrane electrode assembly (MEA).

At the anode, hydrogen molecule (fuel) is oxidized to produce hydrogen protons that will pass through the PEM. The electrons released from hydrogen travel through the external circuitry to do work. At the cathode, oxygen is reduced and reacts with the hydrogen protons to form water. The anodic and cathodic reactions may be described by the following equations:

| | |
|---|---|
| $H_2 \rightarrow 2H^+ + 2e^-$ | at the anode of the cell, |
| and | |
| $O_2 + 4H^+ + 4e^- \rightarrow 2H_2O$ | at the cathode of the cell. |

Because a single fuel cell typically produces a relatively low voltage (less than 1 volt, for example), several serially connected fuel cells may be formed out of an arrangement called a fuel cell stack to produce a higher voltage.

In the arrangement of the fuel cell stack, bipolar plates are provided between adjacent cells. The bipolar plates may be made from graphite or metal for isolating the reactants, e.g. hydrogen and oxygen and, conducting the electricity from one side to the other. Bipolar plates may include various flow channels and orifices to, as examples, route the above-described reactants and products through the fuel cell stack. Several PEMs (each one being associated with a particular fuel cell) may be dispersed throughout the stack between the anodes and cathodes of the different fuel cells.

However, bipolar plate made of graphite is fragile and in practice, has to have considerable thickness for supporting the fuel cell stack. The density of graphite is relatively high, so the bipolar plate is heavy and is about 70 percent of the cell stack in weight. Besides, the bipolar plate made of graphite is hard to be mass-produced and expensive. The graphite bipolar plate is about 60 percent of the fuel cell stack in cost.

Due to the weight and the cost of the graphite plate, the metal bipolar plate is developed. However, metal bipolar plate will be oxidized gradually, so the surface resistance between the bipolar plate and the gas diffusion structure is increased. Besides, metal bipolar may release metal ions which will poison the MEA.

Furthermore, the bipolar plate made of plastic mixed with the graphite or carbon fibers is developed. This bipolar plate has to be formed by compression or injection molding process and its conductivity is relatively lower.

The bipolar plates are stacked to form the fuel cell stack, and are compressed to reduce the contact or constriction resistance between them and the gas diffusion structure. Therefore, the bipolar plates must be provided with a peripheral portion around the flow channel field for assembling the bipolar plates into the fuel cell stack and supporting the weight of the fuel cell stack as well as providing the compressional force.

As mentioned above, the hydrogen protons are generated at the anode in the hydrogen fuel cell, and migrate to the cathode through the PEM. The PEM will dry out due to the migration of the protons, and thus be degraded. An auxiliary device, such as pumps and pipes, is provided to feed water into the anode. Also, the water is generated at cathode, and must be removed to avoid the flood of the gas diffusion/electrode structure which hinders the reaction between the oxidant and the catalyst.

Accordingly, there exists a need for a bipolar plate in a fuel cell which is made by lightweight material and provided with a water transmitting device so as to solve the above mentioned problems and disadvantages.

SUMMARY OF THE INVENTION

It is an object of the present invention to provide a bipolar plate of a fuel cell which is lightweight.

It is another object of the present invention to provide a bipolar plate of a fuel cell which having a water delivery means for delivering water from the cathode of one fuel cell to the anode of adjacent fuel cell.

In order to achieve the objects mentioned hereinabove, the present invention provides a bipolar plate of a fuel cell comprises a body, two flow fields, and electrically conductive fibers. The body has a central portion and a peripheral portion surrounding the central portion. The flow fields are disposed on the two sides of the central portion of the body. The electrically conductive fibers are positioned in the central portion and penetrate therethrough.

According to another aspect of the present invention, the bipolar plate further comprises a plurality of water delivery devices disposed in the central portion for delivering water from one side of the bipolar plate to the other side of the bipolar plate.

The bipolar plate of the fuel cell stack according to the present invention can be made of the lightweight material, so the weight of the fuel cell stack is reduce. Further, the contact or constriction resistance between the bipolar plate and the MEA can be substantially reduced, and thus, in comparison with the conventional bipolar plate, the compressional force between the bipolar plates is reduced. Therefore, the dimension of the fuel cell and the bipolar plates can be reduced. Further, the water delivery devices are provided, so the water between the anode and the cathode within the fuel cell stack can be balanced.

BRIEF DESCRIPTION OF THE DRAWINGS

Other objects, advantages, and novel features of the invention will become more apparent from the following detailed description in conjunction with the accompanying drawings.

DESCRIPTION OF THE PREFERRED EMBODIMENT

Figure 1:
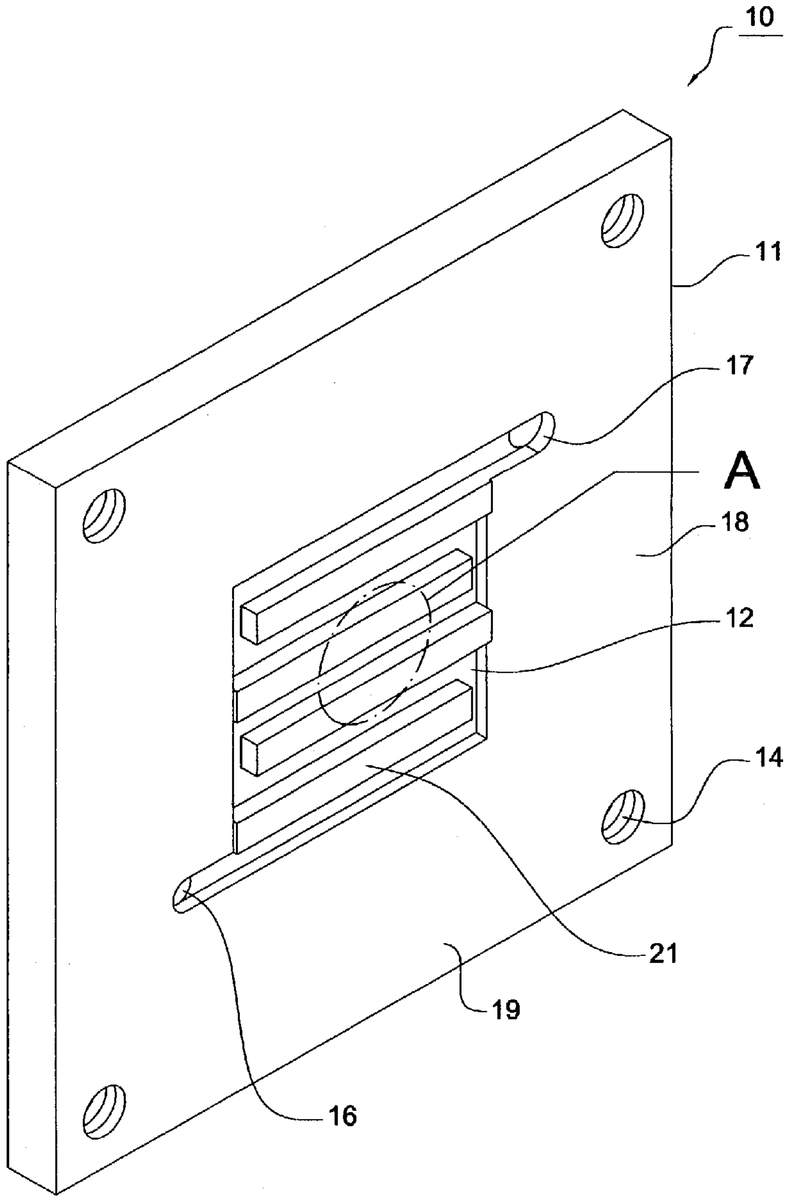
FIG. 1 is a perspective view of a bipolar plate of an embodiment according to the present invention.

Referring to FIG. 1, it depicts a bipolar plate 10 of a first embodiment according to the present invention. The bipolar plate 10 includes a body 11 defining the central portion 21 and a peripheral portion 18 surrounding the central portion 21. The bipolar plate 10 comprises two flow fields 12 each disposed on either side of the central portion 21. The peripheral portion 18 of the body 11 is provided with a plurality of bolt holes 14 for assembling the bipolar plates 10 and membrane electrode assemblies (MEAs) into cell stack. Various manifolds 16, 17 are disposed in the peripheral portion 18 for communicating fluids, such as the fuel and the oxidant, in and out of the cell and the MEA. The peripheral portion 18 has a flat surface 19 that allows the bipolar plate 10 to be sealed with adjacent components of the cell stack, such as a seal or the membrane electrode assembly. The body 11 of the bipolar plate 10 according to the present invention can be made of lightweight material, such as polymer and plastic, by means of injection molding process.

Figure 2:
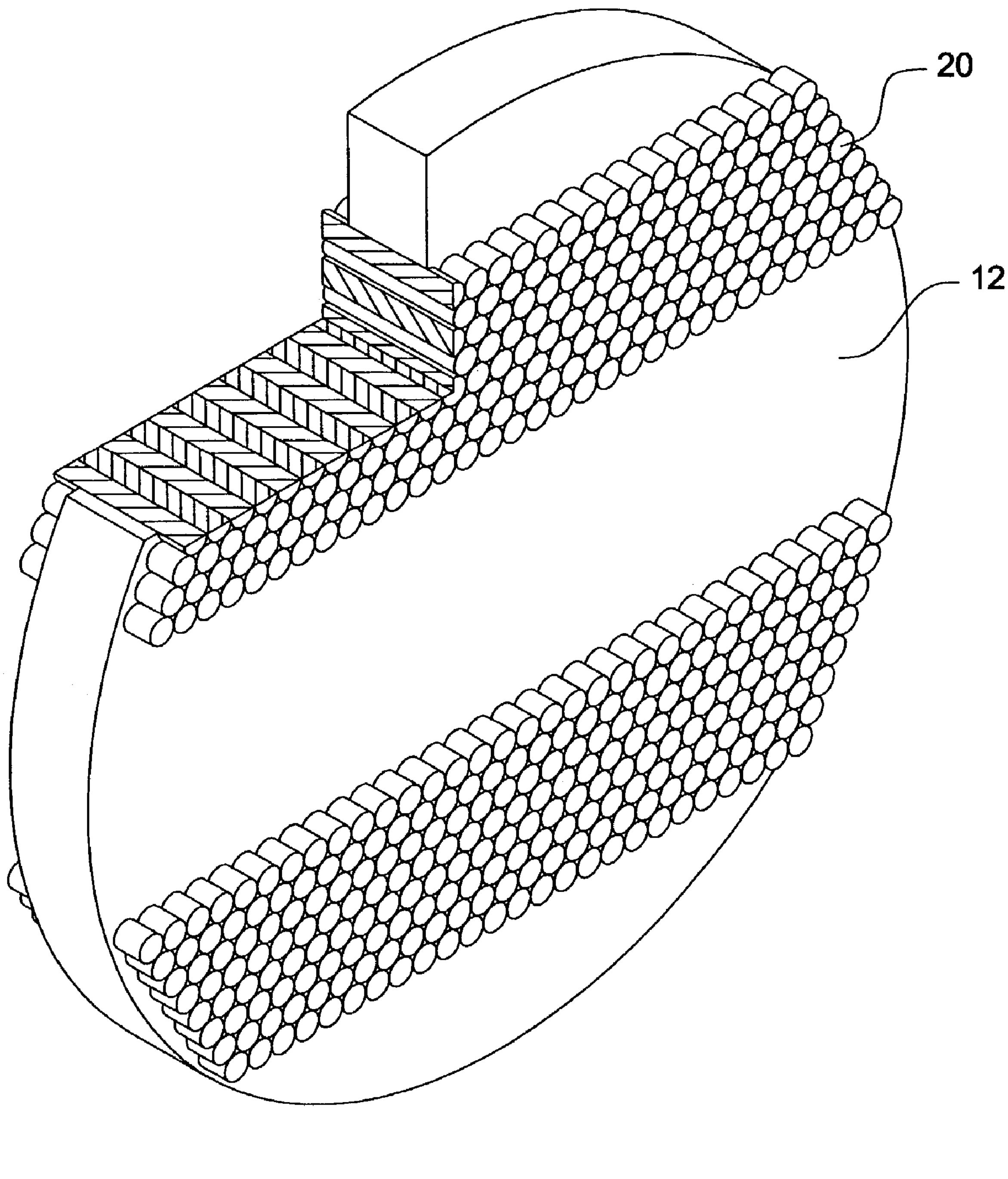
FIG. 2 is a partially enlarged perspective of the bipolar plate shown in FIG. 1.

The flow field 12 may direct fluid flow in many patterns, but is illustrated here as parallel serpentine channels. Referring to FIG. 2, the bipolar plate 10 includes a plurality of electrically conductive fibers 20 disposed in the flow field 12. The electrically conductive fibers 20 penetrate or pass through the bipolar plate 10 for collecting, conducting and delivering the liberated electrons from one electrode (one side of the bipolar plate 12) to the other electrode (the other side of the bipolar plate 12). In fact, the flow pattern is formed or set up by arranging the electrically conductive fibers 20.

The electrically conductive fibers 20 illustrated in the drawings are collocated to form four whisks or bundles, but the arrangement of the electrically conductive fibers 20 can be varied without any limitation. The electrically conductive fibers 20 are made of an electrically conductive flexible fiber material, such as carbon fibers and graphite fibers. The bundles of the electrically conductive fibers 20 are separated due to the compressional force of the assembling of the fuel cell stack so as to form spaces or gaps among the electrically conductive fibers 20. The fuel or the oxidant can diffuse through the spaces or gaps among the individual electrically conductive fibers 20 and can be in contact with the gas diffusion/electrode structure or catalyst, thereby increasing the effective area of the electrodes. The arrangement of the electrically conductive fibers 20 depends on the design requirement, such as the flow pattern of the fuel and oxidant and the internal resistance of the fuel cell stack.

While the bipolar plates 12 and the MEAs are stacked to form the fuel cell stack, all the individual electrically conductive fibers 20 are inserted into or have contact with the gas diffusion structure, e.g. carbon cloth, of the MEA (not shown) so as to reduce the contact or constriction resistance between the electrically conductive fibers 20 and the gas diffusion structure. The gas diffusion structure is typically made of carbon cloth, which is homogenous with the electrically conductive fibers 20 made of carbon fibers such that the internal resistance of the fuel cell stack will be kept at a lower level.

As mentioned above, the bipolar plate 10 according to the present invention is made of lightweight material, so the weight of the fuel cell stack is reduce. Further, the contact or constriction resistance between the bipolar plate 10 and the gas diffusion structure is substantially reduced by changing the nature of the contact between them, and thus, in comparison with the conventional bipolar plate, the large compressional force of the fuel cell stack comprising the bipolar plates 10 will no longer be required. Therefore, the dimension of the bipolar plates 10 can be reduced. Specifically, the dimension of the peripheral portion 18 of the bipolar plates 10 as well as the end plates of the fuel cell stack for supporting and receiving the compressional force can be greatly reduced.

Figure 3:
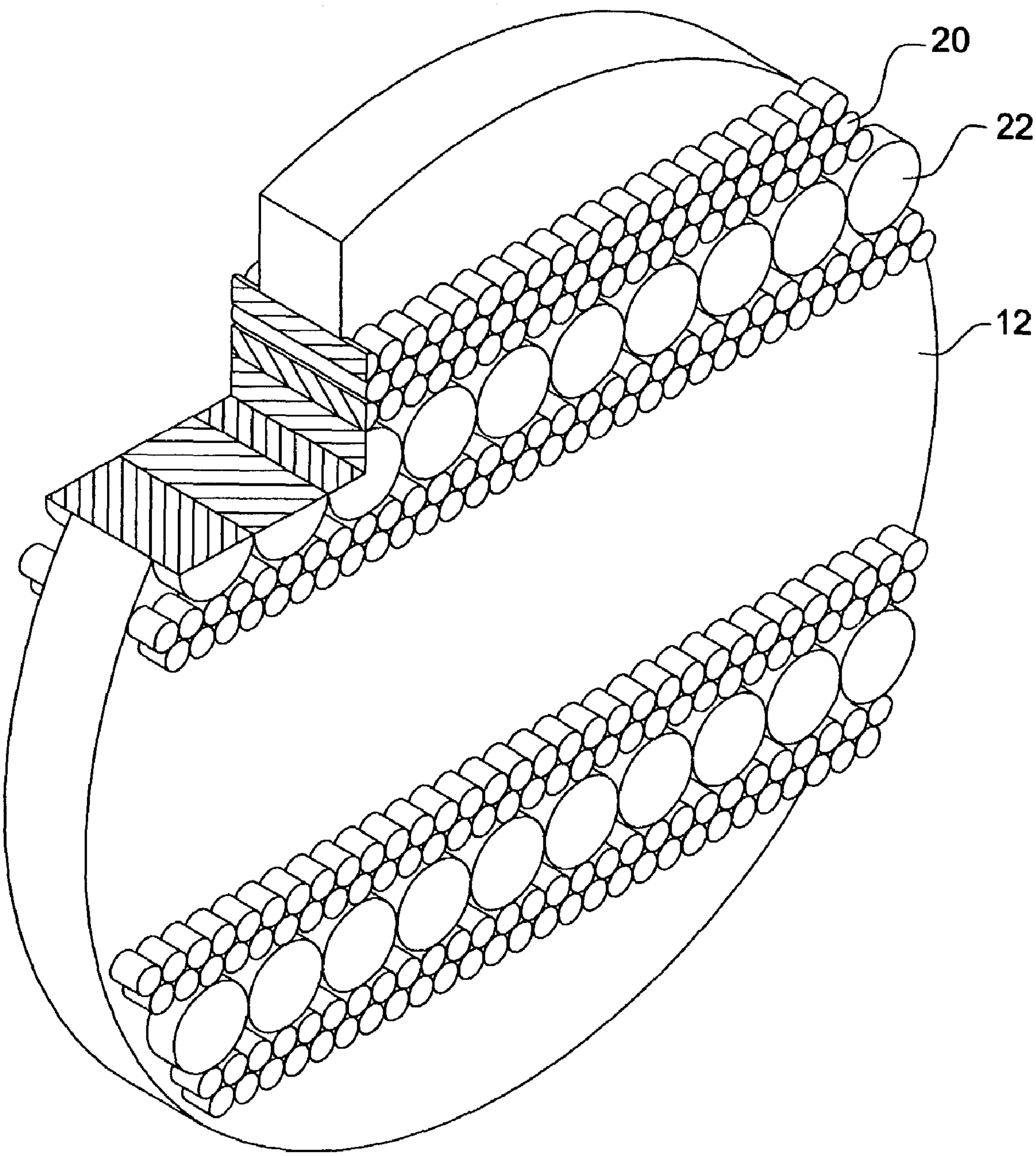
FIG. 3 is a partially enlarged perspective of an alternative bipolar plate of the embodiment according to the present invention.

Although the bipolar plate 10 is preferably provided with the electrically conductive fibers 20 for conducting and delivering the electrons from one electrode to the other electrode, the bipolar plate 10 also can be provided with alternative conductor of electricity. In this arrangement, the conductor is embedded in the body 11, and can be solid and massive in comparison with the electrically conductive fibers. The conductor can be made of electrically conductive material, such as metal or graphite, with/without a coating of gold or silver, for example. Alternatively, the conductor can be made of nonconductive material with a coating of conductor, such as metal, gold or silver, Referring to FIG. 3, it depicts an alternative bipolar plate 10 according to the embodiment of the present invention. The bipolar plate 10 further comprises a plurality of water delivery devices 22 embedded in the electrically conductive fibers 20 through the bipolar plate 10. The water delivery devices 22 according to present invention can be made of, for example, cotton threads for delivering water from the cathode to the anode by the capillarity.

Figure 4:
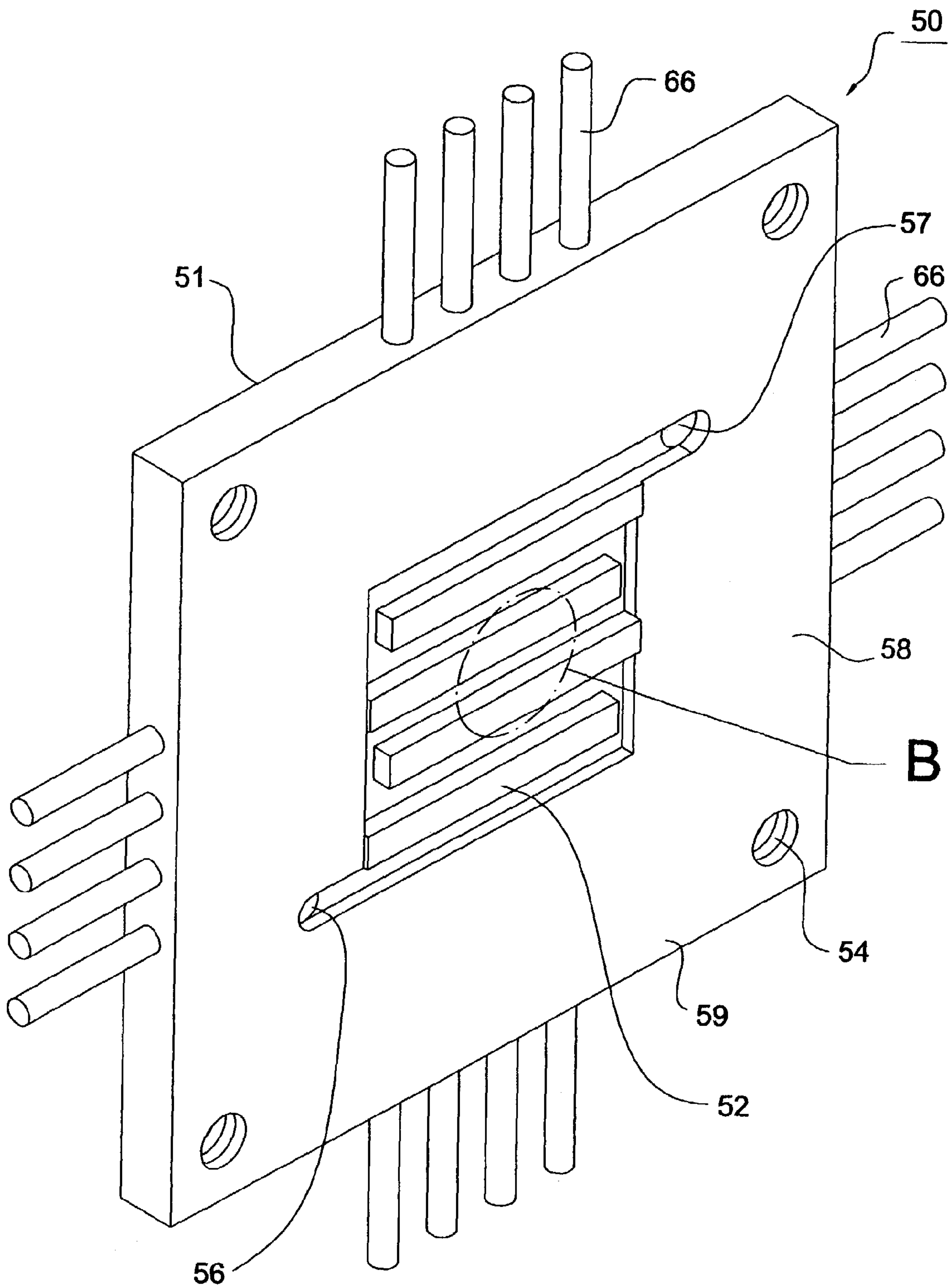
FIG. 4 is a perspective view of a bipolar plate of another embodiment according to the present invention.
Figure 5:
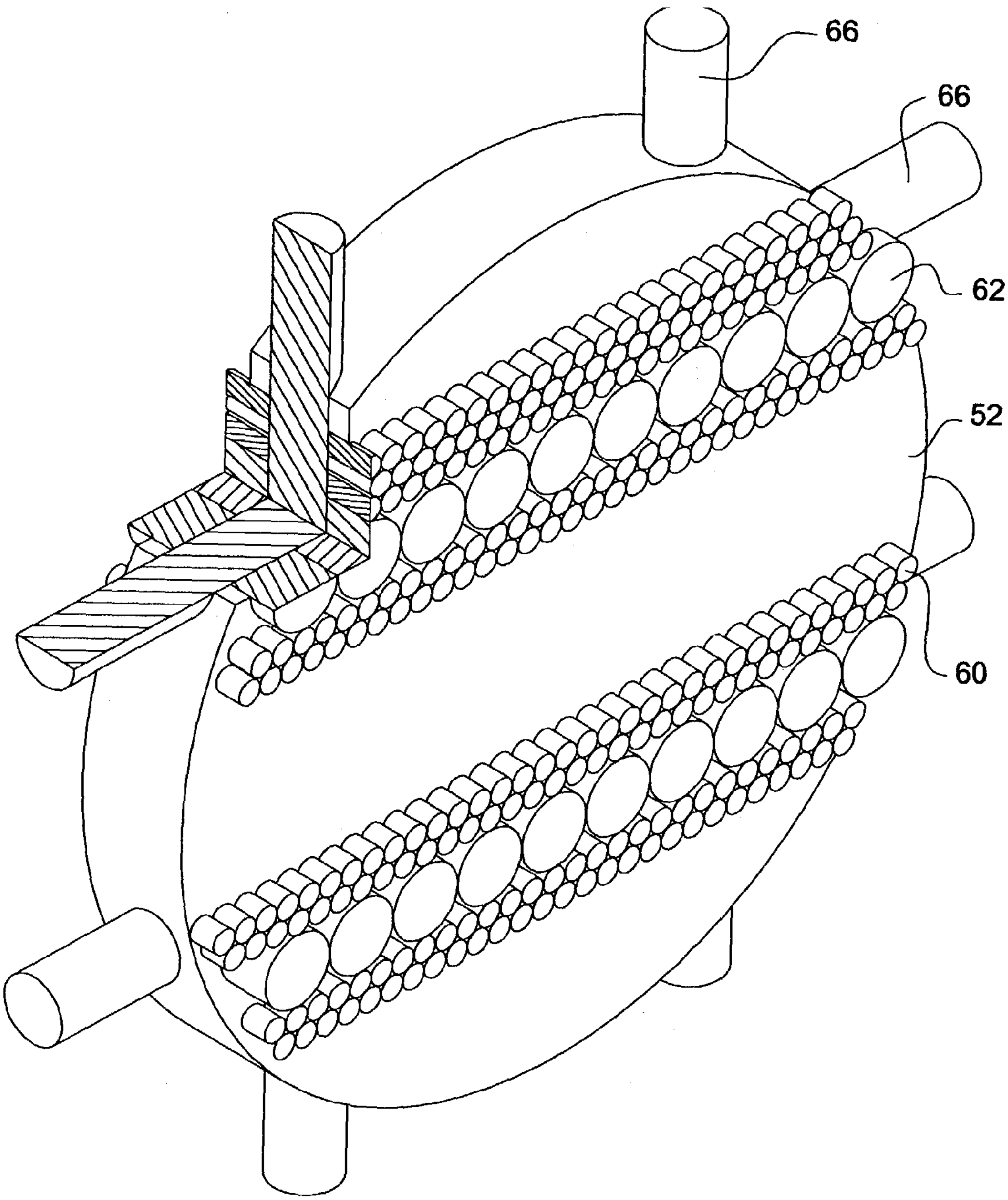
FIG. 5 is a partially enlarged perspective of the bipolar plate shown in FIG. 4.

Now referring to FIGS. 4 and 5, they depict a bipolar plate 50 of another embodiment according to the present invention. The bipolar plate 50 is similar to the bipolar plate 10 wherein the similar elements are designated with the similar reference numerals.

The bipolar plate 50 is provided with a plurality of water feeders 66, which, for example, can be made of cotton threads. The water feeders 66 are in contact with the water delivery devices 62 and extend to the outside of the bipolar plate 50. While the fuel cell stack with the bipolar plate 50 has not been operated for a long time, the water delivery devices 62 and the MEAs of the fuel cell stack are dry. The water feeder 66 is used for feeding water into the fuel cell stack and humidifying the water delivery devices and the MEAs so as to decrease the warm-up period of the fuel cell stack.

Figure 6:
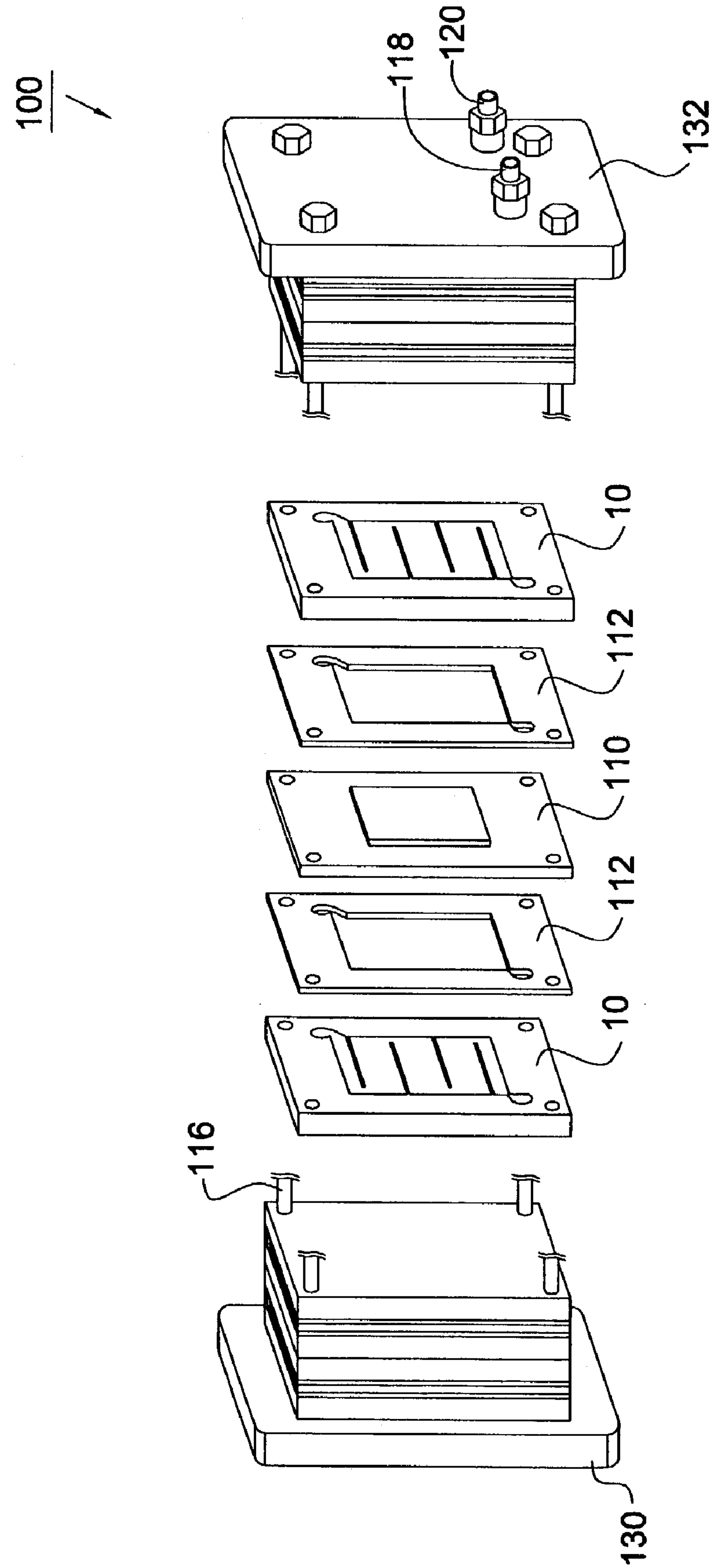
FIG. 6 is a partially exploded view of a fuel cell stack with the bipolar plate according the embodiment of the present invention.

Referring to FIG. 6, it depicts a fuel cell stack 100 having the bipolar plate 10 according to the present invention. The fuel cell stack 100 comprises a stack of the bipolar plates 10, MEAs 110 and seals 112 in series. Alternatively, the seals 112 and the bipolar plates 10 can be molded integrally. The stack of the bipolar plates 10, MEAs 110 and seals 112 is sandwiched by two endplates (monopolar plates) 130, 132 and is secured with four bolts 116. The endplate 132 is provided with a fuel inlet 118 and an oxidant inlet 120 connected to the manifolds 16, 17 of the bipolar plate 10 for feeding fuel or oxidant to the individual reaction chamber of the fuel cell stack 100, and the endplate 130 is provided with a fuel outlet and an oxidant outlet (not shown) for discharging the exhaust fuel and oxidant.

Accordingly, the fuel cell stack and bipolar plate according to the present invention is made of lightweight material and the contact resistance between the bipolar plate and the MEA is substantially reduced, so in comparison with the conventional bipolar plate, the weight of the fuel cell stack and the compressional force between the bipolar plates both are reduced. Therefore, the dimension of the fuel cell and the bipolar plates can be reduced. Further, the water delivery devices are provided, so the water between the anode and the cathode within the fuel cell stack can be balanced.

While the foregoing description and drawings represent the embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components. The presently disclosed embodiments are therefore to be considered in all respects as illustrative and not restrictive, the scope of the invention being indicated by the appended claims and their legal equivalents, and not limited to the foregoing description.

What is claimed is:

1. A bipolar plate of a fuel cell comprising:

a body defining a central portion and a peripheral portion surrounding the central portion;

a plurality of electrically conductive fibers positioned in the central portion and penetrating therethrough, wherein said electrically conductive fibers individually protrude outward out of the central portion and are flexible; and a plurality of water delivery devices disposed in the central portion and penetrating therethrough for delivering water from one side of the bipolar plate to the other side of the bipolar plate, wherein the water delivery devices are cotton threads.

2. A bipolar plate according to claim 1, further comprising at least two flow fields each disposed on the either side of the central portion of the body.

3. A bipolar plate according to claim 2, further comprising a plurality of flow channels disposed in the flow fields and formed by the electrically conductive fibers.

4. A bipolar plate according to claim 1, further comprising a plurality of manifolds connected to the flow fields.

5. A bipolar plate according to claim 1, wherein the body is made of plastic.

6. A bipolar plate according to claim 5, wherein the body is made by injection molding process.

7. A bipolar plate according to claim 1, wherein the electrically conductive fibers are carbon fibers.

8. A bipolar plate according to claim 1, wherein the electrically conductive fibers are graphite fibers.

9. A bipolar plate according to claim 1, further comprising a plurality of water feeders for feeding water to the bipolar plate.

10. A bipolar plate according to claim 9, wherein the water feeders are cotton threads.

11. A bipolar plate according to claim 1, further comprising a plurality of water feeders in contact with the water delivery devices and extending to the outside of the bipolar plate for feeding water to the water delivery devices.

12. A bipolar plate according to claim 11, wherein the water feeders are cotton threads.

13. A bipolar plate of a fuel cell comprising:

a body defining a central portion and a peripheral portion surrounding the central portion;

at least two flow fields disposed on the two sides of the central portion of the body; and a plurality of water delivery devices disposed in the central portion and penetrating therethrough for delivering water from one side of the bipolar plate to the other side of the bipolar plate, wherein the water delivery devices are cotton threads.

14. A bipolar plate according to claim 13, further comprising a plurality of water feeders in contact with the water delivery devices and extending to the outside of the bipolar plate for feeding water to the water delivery devices.

15. A bipolar plate according to claim 14, wherein the water feeders are cotton threads.

16. A fuel cell stack comprising:

two endplates;

a plurality of membrane electrode assemblies sandwiched between the endplates; and a plurality of bipolar plates each sandwiched between the adjacent membrane electrode assemblies, and comprising:

a body defining a central portion and a peripheral portion surrounding the central portion;

a plurality of electrically conductive fibers positioned in the central portion and penetrating therethrough, wherein said electrically conductive fibers individually protrude outward out of the central portion and are flexible; and a plurality of water delivery devices disposed in the central portion and penetrating therethrough for delivering water from one side of the bipolar plate to the other side of the bipolar plate, wherein the water delivery devices are cotton threads.

17. A fuel cell stack according to claim 16, wherein the bipolar plate further comprises at least two flow fields each disposed on the either side of the central portion of the body.

18. A fuel cell stack according to claim 17, wherein the bipolar plate further comprises a plurality of flow channels disposed in the flow fields and formed by the electrically conductive fibers.

19. A fuel cell stack according to claim 16, wherein the bipolar plate further comprises a plurality of manifolds connected to the flow fields.

20. A fuel cell stack according to claim 16, wherein the body is made of plastic.

21. A bipolar plate according to claim 20, wherein the body is made by injection molding process.

22. A fuel cell stack according to claim 16, wherein the electrically conductive fibers are carbon fibers.

23. A fuel cell stack according to claim 16, wherein the electrically conductive fibers are graphite fibers.

24. A fuel cell stack according to claim 16, wherein the bipolar plate further comprises a plurality of water feeders for feeding water to the bipolar plane.

25. A fuel cell stack according to claim 24, wherein the water feeders are cotton threads.

26. A fuel cell stack according to claim 16, wherein the bipolar plate further comprises a plurality of water feeders in contact with the water delivery devices and extending to the outside of the bipolar plate for feeding water to the water delivery devices.

27. A fuel cell stack according to claim 26, wherein the water feeders are cotton threads.

28. A bipolar plate of a fuel cell comprising:

a body defining a central portion and a peripheral portion surrounding the central portion;

at least two flow fields disposed on the two sides of the central portion of the body; and a plurality of water feeders for feeding water to the bipolar plate, wherein the water feeders are cotton threads.

* * * * *